(12) United States Patent
Guo et al.

(10) Patent No.: US 11,561,370 B2
(45) Date of Patent: Jan. 24, 2023

(54) OPTICAL IMAGING LENS DEVICE

(71) Applicant: GLORY SCIENCE CO., LTD., Taichung (TW)

(72) Inventors: Jhao-Ying Guo, Taichung (TW); Hsiang-Chun Hsu, Taichung (TW)

(73) Assignee: Glory Science Co., Ltd., Taichung (TW)

( * ) Notice: Subject to any disclaimer, the term of this patent is extended or adjusted under 35 U.S.C. 154(b) by 242 days.

(21) Appl. No.: 16/949,377

(22) Filed: Oct. 27, 2020

(65) Prior Publication Data
US 2022/0128794 A1 Apr. 28, 2022

(51) Int. Cl.
*G02B 9/34* (2006.01)
*G02B 13/00* (2006.01)

(52) U.S. Cl.
CPC ............. *G02B 13/004* (2013.01); *G02B 9/34* (2013.01)

(58) Field of Classification Search
CPC ................................ G02B 13/004; G02B 9/34
See application file for complete search history.

(56) References Cited

U.S. PATENT DOCUMENTS

2014/0185151 A1* 7/2014 Chen .................. G02B 9/34
359/773

* cited by examiner

*Primary Examiner* — Joseph P Martinez
(74) *Attorney, Agent, or Firm* — Wang Law Firm, Inc.

(57) ABSTRACT

An optical imaging lens device includes, in order from the object side to the image side: a first lens element having positive refractive power and an object-side surface convex in a paraxial region thereof; a second lens element having negative refractive power and an object-side surface concave in a paraxial region thereof; a third lens element having positive refractive power, an object-side surface concave in a paraxial region thereof, and an image-side surface convex in a paraxial region thereof; a fourth lens element having negative refractive power, an object-side surface convex in a paraxial region thereof and concave in an off-axis region thereof, and an image-side surface concave in a paraxial region thereof and convex in an off-axis region thereof. When a certain condition is satisfied, the optical imaging lens device may have both a compact size and wide field of view.

17 Claims, 7 Drawing Sheets

OPTICAL IMAGING LENS DEVICE

BACKGROUND

Field of the Invention

The present invention relates to a lens system, and more particularly to an optical imaging lens device having four lens elements.

Description of the Prior Art

As the advanced semiconductor manufacturing technologies have allowed the performance of image sensors to be improved and the pixel size of the image sensors to be reduced and compact, optical lens devices with high image quality have become an indispensable part.

In addition, with the progress of science and technology, optical imaging lens devices can be used on electronic devices in more fields, and the requirements for the optical imaging lens device are more diversified. Since the existing optical imaging lens device is not easy to balance the requirements of imaging quality, sensitivity, aperture stop size, volume or field of view, the present invention provides an optical imaging lens device to meet the requirements.

The present invention mitigates and/or obviates the aforementioned disadvantages.

SUMMARY

The primary objective of the present invention is to provide an optical imaging lens device having high image quality and small size.

According to one aspect of the present invention, an optical imaging lens device comprises four lens elements each having an object-side surface facing an object side and an image-side surface facing an image side, and the four lens elements, in order from the object side to the image side, comprise: a first lens element with positive refractive power having the object-side surface that is convex in a paraxial region thereof; a second lens element with negative refractive power having the object-side surface that is concave in a paraxial region thereof; a third lens element with positive refractive power having the object-side surface that is concave in a paraxial region thereof, and the image-side surface that is convex in a paraxial region thereof; a fourth lens element with negative refractive power, having the object-side surface that is convex in a paraxial region thereof and is concave in an off-axis region thereof, and the image-side surface that is concave in a paraxial region thereof and is convex in an off-axis region thereof. The Abbe number of the first lens element is Vd1, the Abbe number of the second lens element is Vd2, the Abbe number of the third lens element is Vd3, the Abbe number of the fourth lens element is Vd4, a distance between the object-side surface and the image-side surface of the first lens element in an optical axis is CT1, a distance between the object-side surface and the image-side surface of the second lens element in the optical axis is CT2, a distance between the object-side surface and the image-side surface of the third lens element in the optical axis is CT3, a distance between the object-side surface and the image-side surface of the fourth lens element in the optical axis is CT4, a focal length of the first lens element is f1, a focal length of the second lens element is f2, a focal length of the third lens element is f3, a focal length of the fourth lens element is f4, the minimum refractive index among refractive indexes of these lens elements is Nmin, the maximum refractive index among the refractive indexes of these lens elements is Nmax. The following condition is satisfied:

$Vd2/CT2 \le Vd3/CT3 \le Vd1/CT1$;

$100 \le Vd4/CT4 \le 250$;

$0.2 < (|f1|+|f3|)/(|f2|+|f4|) < 1.0$; or $0.11 \le N\max - N\min$.

According to another aspect of the present invention, the following condition is further satisfied:

$150 \le Vd4/CT4 \le 230$;

$0.3 < (|f1|+|f3|)/(|f2|+|f4|) < 0.6$;

$Dr4r6/TTL < 0.16$;

$-1 < (R4-R5)/(R4+R5) < 15$;

$0.65 < f3/f < 0.75$;

$Vd4-Vd2 > 35$;

$10 < Dr7r8 \times 100/TTL < 20$;

$Dr4r7/f < 0.6$; or $FOV > 77$ degrees.

Wherein the Abbe number of the second lens element is Vd2, the Abbe number of the fourth lens element is Vd4, the focal length of the first lens element is f1, the focal length of the second lens element is f2, the focal length of the third lens element is f3, the focal length of the fourth lens element is f4, a focal length of the optical imaging lens device is f, the distance between the object-side surface and the image-side surface of the fourth lens element in the optical axis is CT4, a distance from the object-side surface of the first lens element to an image plane along the optical axis is TTL, a radius of curvature of the object-side surface of the second lens element is R4, a radius of curvature of the image-side surface of the second lens element is R5, a distance from the object-side surface of the second lens element to the object-side surface of the third lens element along the optical axis is Dr4r6, a distance from the object-side surface of the second lens element to the image-side surface of the third lens element along the optical axis is Dr4r7, a distance from the image-side surface of the third lens element to the object-side surface of the fourth lens element along the optical axis is Dr7r8, and the maximal field of view of the optical imaging lens device is FOV.

According to yet another aspect of the present invention, the image-side surface of the first lens element is concave in a paraxial region thereof, and the image-side surface of the second lens element is convex in a paraxial region thereof.

According to yet another aspect of the present invention, the image-side surface of the first lens element is convex in a paraxial region thereof, and the image-side surface of the second lens element is concave in a paraxial region thereof.

If Vd3/CT3, Vd4/CT4, Dr4r6/TTL and Dr7r8×100/TTL satisfy the above conditions, the optical imaging lens device may be more compact and have a smaller total track length.

If (|f1|+|f3|)/(|f2|+|f4|) and Nmax-Nmin satisfy the above conditions, the imaging angle of the optical imaging lens device may be increased for a wider image capturing range (viewfinder coverage), the sensitivity of assembly may be reduced, and the occurrence of ghost image caused by secondary reflection from the fourth lens element may also be effectively prevented.

If (R4−R5)/(R4+R5) satisfies the above condition, the spherical aberrations of the optical imaging lens device may be better balanced, and the assembly tolerance of the optical imaging lens device may also be reduced.

If f3/f satisfies the above condition, the assembly tolerance of the optical imaging lens device may be reduced, and the back focal length may also be sufficient to provide an appropriate space for placing other components, avoiding the problems caused by the imaging of dust particles.

If Vd4−Vd2 satisfies the above condition, the chromatic aberrations of the optical imaging lens device may be well corrected.

If Dr4r7/f satisfies the above condition, the total track length of the optical imaging lens device may be further reduced, and the angle of view may be increased too.

If FOV satisfies the above condition, the larger field of view may be provided for wide-range imaging without image distortion.

The present invention will be presented in further details from the following descriptions with the accompanying drawings, which show, for purpose of illustrations only, the preferred embodiments in accordance with the present invention.

DETAILED DESCRIPTION

In the following detailed description, many specific details are elaborated to provide a thorough understanding of the invention. However, ordinary technicians in this field will understand that the invention can be practiced without these specific details. In other cases, well-known methods, processes and/or components are not described in detail to avoid making the invention unclear.

An optical imaging lens device comprises four lens elements each having an object-side surface facing an object side and an image-side surface facing an image side, and the four lens elements in order from the object side to the image side include: a first lens element, a second lens element, a third lens element, and a fourth lens element.

The first lens element may have positive refractive power and the object-side surface that is convex in a paraxial region thereof.

The second lens element may have negative refractive power and the object-side surface that is concave in a paraxial region thereof.

The third lens element may have positive refractive power, the object-side surface that is concave in a paraxial region thereof, and the image-side surface that is convex in a paraxial region thereof.

Figure 7:
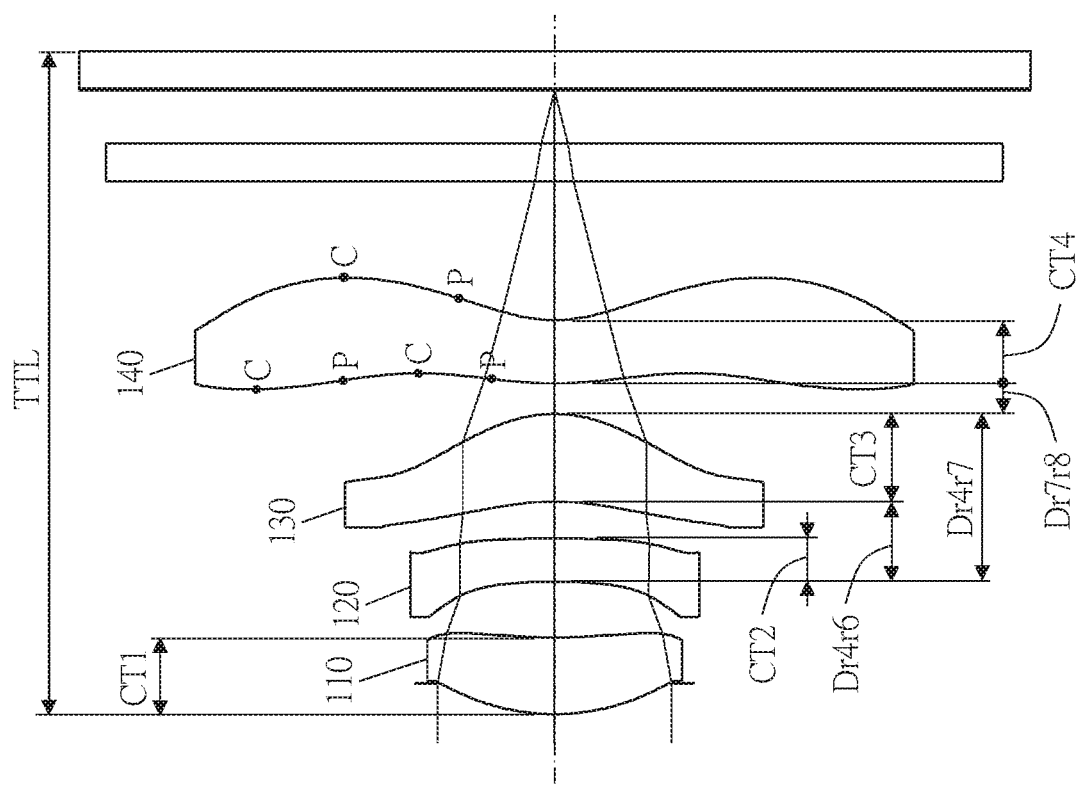
FIG. 7 is a schematic diagram showing the parameters and characteristics of the optical imaging lens device based on the first embodiment of the present invention.

The fourth lens element may have negative refractive power, the object-side surface and the image-side surface of the fourth lens element may be aspheric and provided with at least one inflection point, see the inflection point P as shown in FIG. 7. The object-side surface is convex in a paraxial region thereof and is concave in an off-axis region thereof, and the image-side surface is concave in a paraxial region thereof and is convex in an off-axis region thereof.

Please refer to the parameters and characteristics of the optical imaging lens device of the first embodiment shown in FIG. 7 below to illustrate the property of the optical imaging lens device of the present invention.

An Abbe number of the first lens element is Vd1, an Abbe number of the second lens element is Vd2, an Abbe number of the third lens element is Vd3, a distance between the object-side surface and the image-side surface of the first lens element in the optical axis is CT1, a distance between the object-side surface and the image-side surface of the second lens element in the optical axis is CT2, a distance between the object-side surface and the image-side surface of the third lens element in the optical axis is CT3, and if the optical imaging lens device satisfies the following condition (1): Vd2/CT2≤Vd3/CT3≤Vd1/CT1, the optical imaging lens device may be more compact and have a smaller total track length.

An Abbe number of the fourth lens element is Vd4, a distance between the object-side surface and the image-side surface of the fourth lens element in the optical axis is CT4, and if the optical imaging lens device satisfies the following condition (2): 100≤Vd4/CT4≤250, the optical imaging lens device may be more compact and have a smaller total track length. The preferable range of the condition (2) is: 150≤Vd4/CT4≤230.

A focal length of the first lens element is f1, a focal length of the second lens element is f2, a focal length of the third lens element is f3, a focal length of the fourth lens element is f4, and if the optical imaging lens device satisfies the following condition (3): 0.2<(|f1|+|f3|)/(|f2|+|f4|)<1.0, the imaging angle of the optical imaging lens device may be increased for a wider image capturing range (viewfinder coverage), the sensitivity of assembly may be reduced, and the occurrence of ghost image caused by secondary reflection from the fourth lens element may also be effectively prevented. The preferable range of the condition (3) is: 0.3<(|f1|+|f3|)/(|f2|+|f4|)<0.6.

The minimum refractive index among refractive indexes of these lens elements is Nmin, the maximum refractive index among the refractive indexes of these lens elements is Nmax, and if the optical imaging lens device satisfies the following condition (4): 0.11≤Nmax−Nmin, the imaging angle of the optical imaging lens device may be increased for a wider image capturing range, the sensitivity of assembly may be reduced, and the occurrence of ghost image caused by secondary reflection from the fourth lens element may also be effectively prevented.

A distance from the object-side surface of the second lens element to the object-side surface of the third lens element along the optical axis is Dr4r6, a distance from the object-side surface of the first lens element to an image plane along the optical axis is TTL, and if the optical imaging lens device satisfies the following condition (5): Dr4r6/TTL<0.16, the total track length of the optical imaging lens device may be reduced.

A radius of curvature of the object-side surface of the second lens element is R4, a radius of curvature of the image-side surface of the second lens element is R5, and if the optical imaging lens device satisfies the following condition (6): −1<(R4−R5)/(R4+R5)<15, the spherical aberrations of the optical imaging lens device may be better balanced, and the assembly tolerance of the optical imaging lens device may also be reduced.

The focal length of the third lens element is f3, the focal length of the fourth lens element is f4, a focal length of the optical imaging lens device is f, and if the optical imaging lens device satisfies the following condition (7): 0.65<f3/f<0.75, the refractive power of the optical imaging lens device may be distributed properly, the assembly tolerance of the optical imaging lens device may be reduced, and the back focal length may also be sufficient to provide an appropriate space for placing other components, such as an infrared filter plate and a sensor protection glass plate for avoiding the problems caused by the imaging of dust particles.

The Abbe number of the second lens element is Vd2, the Abbe number of the fourth lens element is Vd4, and if the optical imaging lens device satisfies the following condition (8): Vd4−Vd2>35, the chromatic aberrations of the optical imaging lens device may be well corrected.

A distance from the image-side surface of the third lens element to the object-side surface of the fourth lens element along the optical axis is Dr7r8, the distance from the object-side surface of the first lens element to the image plane along the optical axis is TTL, and if the optical imaging lens device satisfies the following condition (9): 10<Dr7r8×100/TTL<20, the total track length of the optical imaging lens device may be reduced.

A distance from the object-side surface of the second lens element to the image-side surface of the third lens element along the optical axis is Dr4r7, and if the optical imaging lens device satisfies the following condition (10): Dr4r7/f<0.6, the total track length of the optical imaging lens device may be further reduced, and the angle of view may be increased too.

The maximal field of view of the optical imaging lens device is FOV, and if the optical imaging lens device satisfies the following condition (11): FOV>77 degrees, the larger field of view may be provided for wide-range imaging without image distortion.

Details of the implementation aspects of the above embodiments are described as follows.

Figure 1:
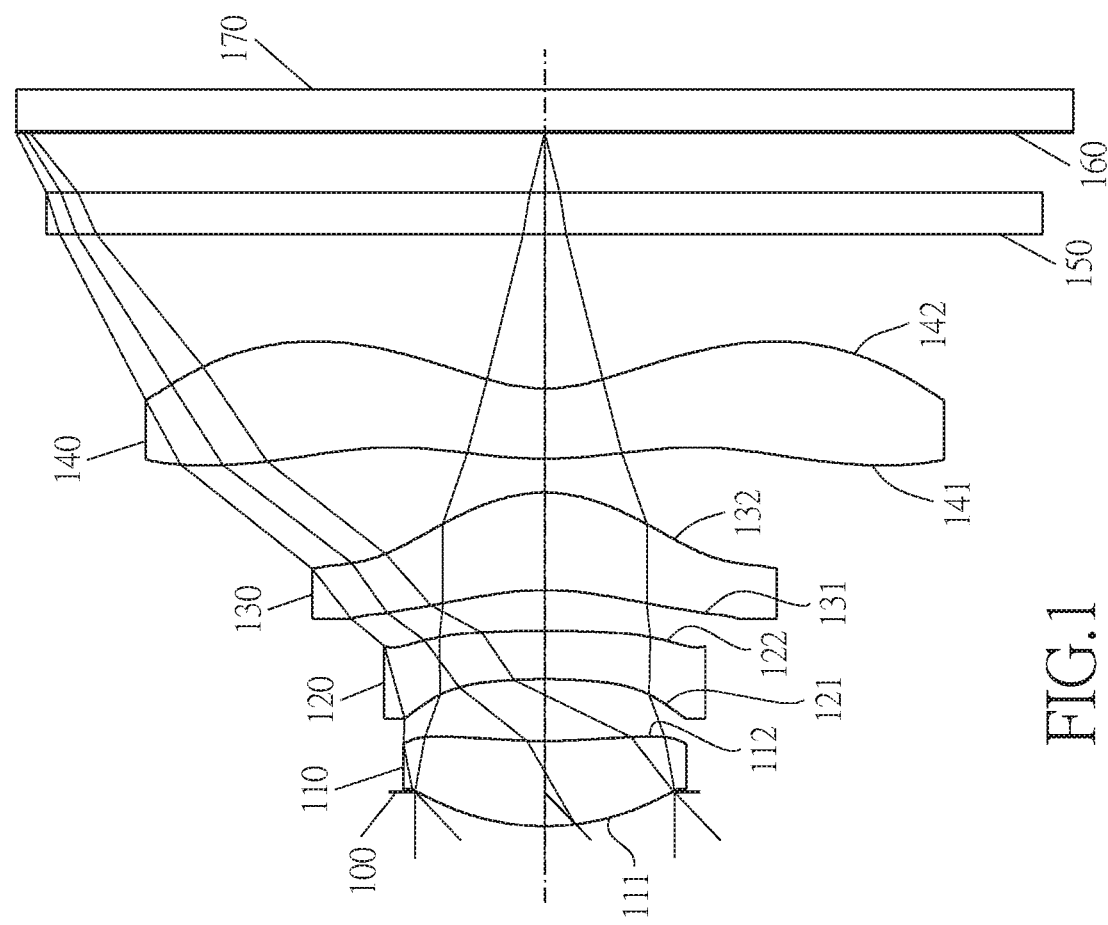
FIG. 1 is a schematic diagram showing an optical imaging lens device in accordance with a first embodiment of the present invention.
Figure 2:
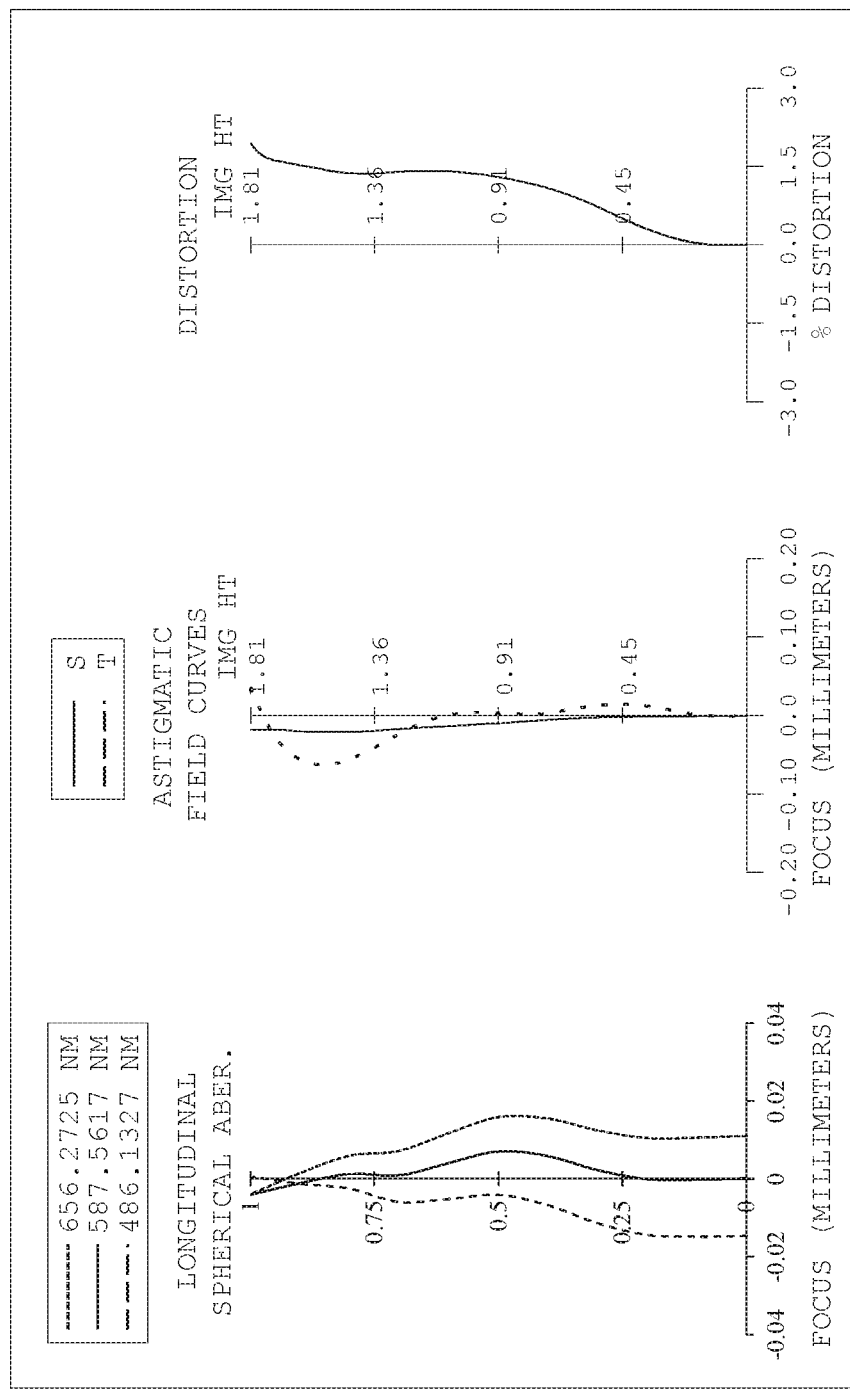
FIG. 2 is a schematic diagram showing the longitudinal spherical aberration curve, the astigmatic field curve and the distortion curve of the first embodiment of the present invention.

An optical imaging lens device in accordance with a first embodiment of the present invention shown in FIGS. 1, 2 and 7 comprises, in order from an object side to an image side: an aperture stop 100, a first lens element 110, a second lens element 120, a third lens element 130, a fourth lens element 140, an infrared ray (IR) filter 150, and an image plane 160, and an image sensor 170 is disposed on the image plane 160. The optical imaging lens device comprises four lens elements (110, 120, 130, 140) and there are no other interpolated lens elements between the lens elements.

The first lens element 110 with positive refractive power has an object-side surface 111 being convex in a paraxial region thereof and an image-side surface 112 being concave in a paraxial region thereof, both the object-side and image-side surfaces 111, 112 are aspheric, and the first lens element 110 is made of plastic material.

The second lens element 120 with negative refractive power has an object-side surface 121 being concave in a paraxial region thereof and an image-side surface 122 being convex in a paraxial region thereof, both the object-side and image-side surfaces 121, 122 are aspheric, and the second lens element 120 is made of plastic material.

The third lens element 130 with positive refractive power has an object-side surface 131 being concave in a paraxial region thereof and an image-side surface 132 being convex in a paraxial region thereof, both the object-side and image-side surfaces 131, 132 are aspheric, the third lens element 130 is made of plastic material.

The fourth lens element 140 with negative refractive power has an object-side surface 141 being convex in a paraxial region thereof and an image-side surface 142 being concave in a paraxial region thereof, both the object-side and image-side surfaces 141, 142 are aspheric, the fourth lens element 140 is made of plastic material. The object-side surface 141 has two inflection points and two critical points in an off-axis region thereof, part of the object-side surface 141 is convex at the critical point on the radial outer side, and part of the object-side surface 141 is concave at the critical point on the radial inner side. The image-side surface 142 has an inflection point and a critical point in an off-axis region thereof, and part of the image-side surface 142 is convex at the critical point.

The IR filter 150 is a glass plate and is located between the fourth lens element 140 and the image plane 160 (at the imaging side of the fourth lens element 140) and has no influence on the focal length of the optical imaging lens device.

The detailed parameters of the elements in the first embodiment are shown in Table 1, wherein a focal length of the optical imaging lens device is f, an aperture stop value (f-number) of the optical imaging lens device is Fno, half of the maximal field of view of the optical imaging lens device is HFOV, and the units of the radius of curvature, the surface spacing and the focal length in table 1 are expressed in mm.

TABLE 1 f(focal length) = 1.87 mm, Fno = 2.08, HFOV = 43.5 deg., the reference wavelength is 587.6 nm

| Surface | | Curvature Radius | Surface spacing | Focal length | index | Abbe # |
|---|---|---|---|---|---|---|
| 0 | Object | Plane | Infinity | — | — | — |
| 1 | Aperture stop | Plane | −0.119302964 | — | — | — |
| 2 | Lens 1 | 0.856919052679944 | 0.299598334 | 2.202878 | 1.5445 | 55.99 |
| 3 | | 2.60875521969514 | 0.216895413 | | | |
| 4 | Lens 2 | −2.64844218447996 | 0.170620228 | −8.20041 | 1.6713 | 19.243 |

TABLE 1-continued f(focal length) = 1.87 mm, Fno = 2.08, HFOV = 43.5 deg., the reference wavelength is 587.6 nm

| Surface | | Curvature Radius | Surface spacing | Focal length | index | Abbe # |
|---|---|---|---|---|---|---|
| 5 | | −5.19223484585967 | 0.142551788 | | | |
| 6 | Lens 3 | −1.04233335616173 | 0.343394009 | 1.385879 | 1.5445 | 55.99 |
| 7 | | −0.48958747515763 | 0.118626659 | | | |
| 8 | Lens 4 | 1.46574450790008 | 0.246559456 | −1.67994 | 1.5445 | 55.99 |
| 9 | | 0.530822571530234 | 0.543724446 | | | |
| 10 | IR-filter | Plane | 0.145 | — | 1.518 | 64.2 |
| 11 | | Plane | 0.211589564 | | | |
| 12 | Image plane | Plane | — | — | — | — |

The equation for the aspheric surface profiles of the lens elements in the first embodiment is expressed as follows:

$$X(Y) = (Y^2/R) \bigg/ \left(1 + \sqrt{1 - (1+k) \times (Y/R)^2}\right) + \sum_i (Ai) \times (Y^i)$$

X represents the relative distance between a point on the aspheric surface spaced at a distance Y from the optical axis and the tangential plane at the vertex of the aspheric surface in the optical axis;

Y represents a vertical distance from the point on the aspheric surface to the optical axis;

R represents the curvature radius;

k represents the conic constant;

Ai represents the i-th order aspheric coefficient.

The aspheric surface data of the first embodiment is shown in table 2, the surface numbers 2-9 represent the surfaces sequentially arranged from the object-side to the image-side, k represents the conic coefficient of the equation of the aspheric surface profiles, and A4-A14 represent the 4-th to 14-th order aspheric coefficients of each surface.

TABLE 2

Aspheric Coefficients

| Surface # | 2 | 3 | 4 | 5 |
|---|---|---|---|---|
| K= | −3.25049E+00 | −7.00785E+01 | 2.43843E+01 | 7.96255E+01 |
| A4= | 8.02807E−01 | 4.59343E−01 | −1.04588E+00 | −3.35511E−01 |
| A6= | −5.03831E+00 | −9.16699E+00 | −2.96786E+00 | 1.92769E+00 |
| A8= | 6.64518E+01 | 8.08623E+01 | 2.98288E+01 | −2.99257E+01 |
| A10= | −5.10646E+02 | −5.63988E+02 | −5.48405E+02 | 9.08357E+01 |
| A12= | 1.94600E+03 | 1.85033E+03 | 3.10531E+03 | −1.30703E+01 |
| A14= | −3.07488E+03 | −2.49380E+03 | −4.97416E+03 | −1.78777E+01 |

| Surface # | 6 | 7 | 8 | 9 |
|---|---|---|---|---|
| K= | −1.49726E+01 | −9.22405E−01 | −2.15829E+00 | −5.13648E+00 |
| A4= | −7.67883E−01 | 1.62077E+00 | −9.02569E−01 | −5.31484E−01 |
| A6= | 1.14618E+01 | −5.65325E+00 | 9.20148E−01 | 6.37673E−01 |
| A8= | −6.03729E+01 | 2.31035E+01 | −3.75127E−01 | −5.95682E−01 |
| A10= | 1.58704E+02 | −4.16117E+01 | 1.31091E−02 | 3.55957E−01 |
| A12= | −2.00990E+02 | 3.27777E+01 | 3.35168E−02 | −1.20424E−01 |
| A14= | 9.30516E+01 | −9.50515E+00 | −6.77385E−03 | 1.74797E−02 |

The results of substituting the parameters of the optical imaging lens device of the first embodiment in the above conditions (1) to (11) are shown in Table 3, wherein an Abbe number of the first lens element 110 is Vd1, an Abbe number of the second lens element 120 is Vd2, an Abbe number of the third lens element 130 is Vd3, an Abbe number of the fourth lens element 140 is Vd4, a distance between the object-side surface 111 and the image-side surface 112 of the first lens element 110 in the optical axis is CT1, a distance between the object-side surface 121 and the image-side surface 122 of the second lens element 120 in the optical axis is CT2, a distance between the object-side surface 131 and the image-side surface 132 of the third lens element 130 in the optical axis is CT3, a distance between the object-side surface 141 and the image-side surface 142 of the fourth lens element 140 in the optical axis is CT4, a focal length of the first lens element 110 is f1, a focal length of the second lens element 120 is f2, a focal length of the third lens element 130 is f3, a focal length of the fourth lens element 140 is f4, the minimum refractive index of refractive indexes of these lens elements is Nmin, the maximum refractive index of the refractive indexes of these lens elements is Nmax, a focal length of the optical imaging lens device is f, a distance from the object-side surface 111 of the first lens element 110 to the image plane 160 along the optical axis is TTL, a radius of curvature of the object-side surface 121 of the second lens element 120 is R4, a radius of curvature of the image-side surface 122 of the second lens element 120 is R5, a distance from the object-side surface 121 of the second lens element 120 to the object-side surface 131 of the third lens element 130 along the optical axis is Dr4r6, a distance from the object-side surface 121 of the second lens element 120 to the image-side surface 132 of the third lens element 130 along the optical axis is Dr4r7, a distance from the image-side surface 132 of the third lens element 130 to the object-side surface 141 of the fourth lens element 140 along the optical axis is Dr7r8, and the maximal field of view of the optical imaging lens device is FOV.

TABLE 3

| | | | |
|---|---|---|---|
| Vd1/CT1 | 186.88355 | (|f1| + |f3|)/(|f2| + |f4|) | 0.3632215 |
| Vd2/CT2 | 112.78264 | Nmax − Nmin | 0.1268 |
| Vd3/CT3 | 163.04885 | Dr4r6/TTL | 0.128425 |
| Vd4/CT4 | 227.08519 | (R4 − R5)/R4 + R5) | −0.324435 |
| Dr7r8 × 100/TTL | 14.975483 | f3/f | 0.7411119 |
| Dr4r7/f | 0.4145415 | Vd4 − Vd2 > 35 | 36.747 |
| FOV | 87 | | |

It can be appreciated from Table 3 that the optical imaging lens device of the first embodiment meets the above conditions (1) to (11).

Figure 3:
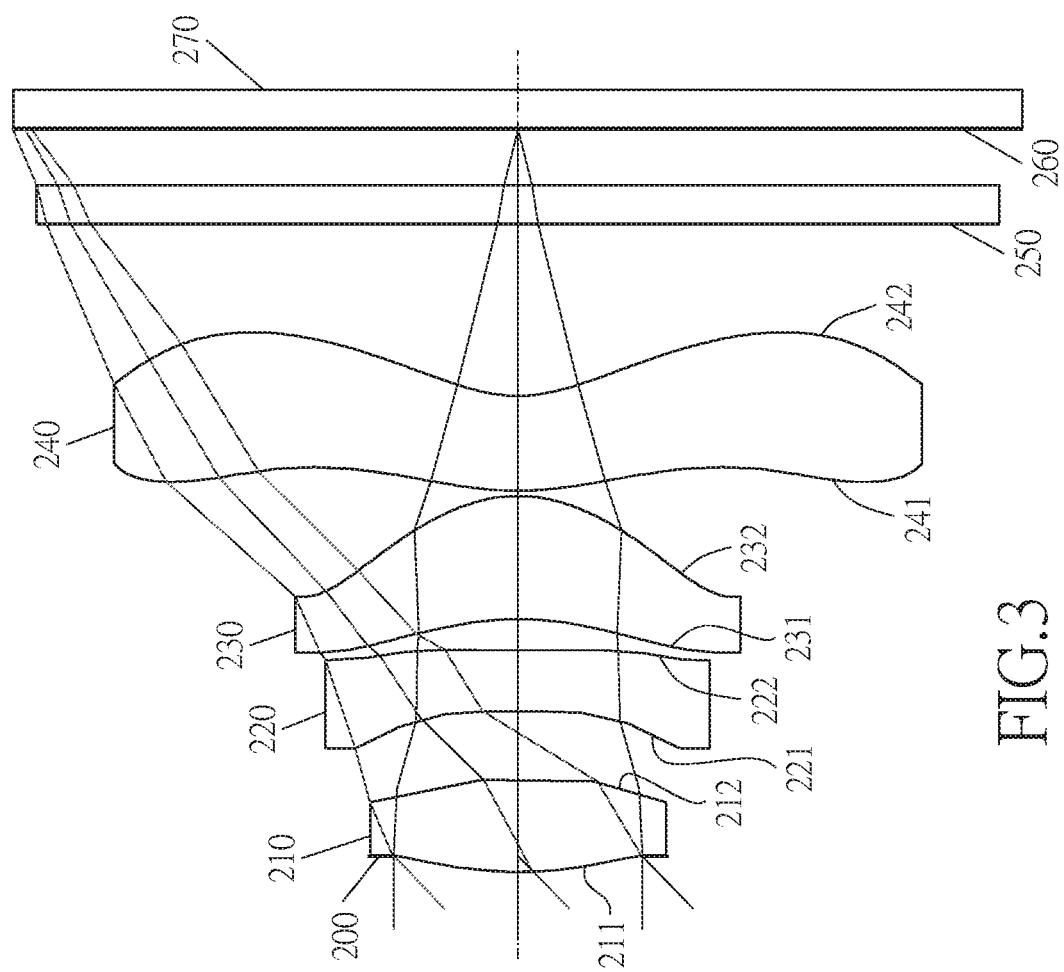
FIG. 3 is a schematic diagram showing an optical imaging lens device in accordance with a second embodiment of the present invention.
Figure 4:
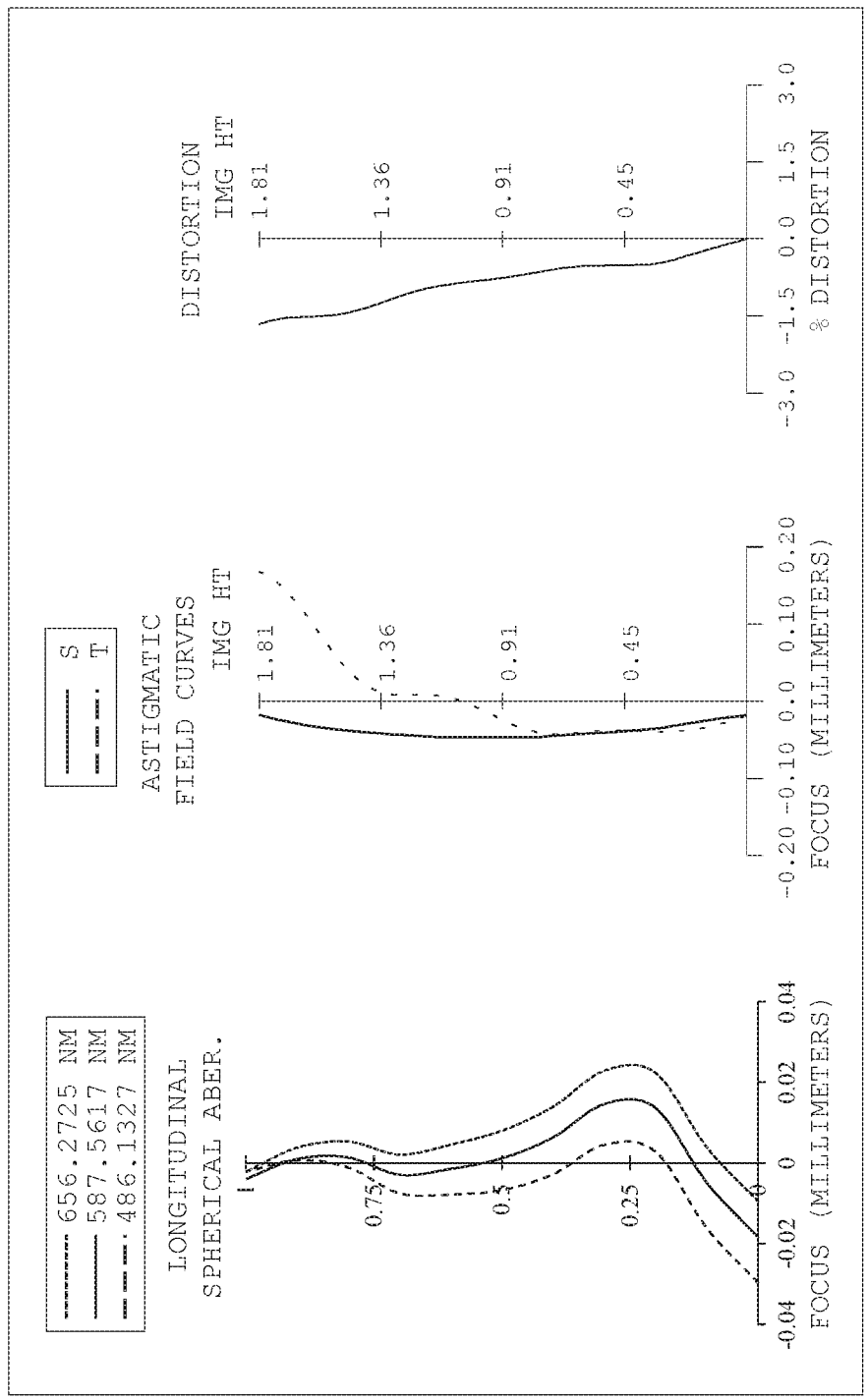
FIG. 4 is a schematic diagram showing the longitudinal spherical aberration curve, the astigmatic field curve and the distortion curve of the second embodiment of the present invention.

An optical imaging lens device in accordance with a second embodiment of the present invention shown in FIGS. 3 and 4 comprises, in order from an object side to an image side: an aperture stop 200, a first lens element 210, a second lens element 220, a third lens element 230, a fourth lens element 240, an IR filter 250, and an image plane 260, and an image sensor 270 is disposed on the image plane 260. The optical imaging lens device comprises four lens elements (210, 220, 230, 240) and there are no other interpolated lens elements between the lens elements.

The first lens element 210 with positive refractive power has an object-side surface 211 being convex in a paraxial region thereof and an image-side surface 212 being convex in a paraxial region thereof, both the object-side and image-side surfaces 211, 212 are aspheric, and the first lens element 210 is made of plastic material.

The second lens element 220 with negative refractive power has an object-side surface 221 being concave in a paraxial region thereof, and an image-side surface 222 being concave in a paraxial region thereof, both the object-side and image-side surfaces 221, 222 are aspheric, and the second lens element 220 is made of plastic material.

The third lens element 230 with positive refractive power has an object-side surface 231 being concave in a paraxial region thereof, and an image-side surface 232 being convex in a paraxial region thereof, both the object-side and image-side surfaces 231, 232 are aspheric, and the third lens element 230 is made of plastic material.

The fourth lens element 240 with negative refractive power has an object-side surface 241 being convex in a paraxial region thereof, and an image-side surface 242 being concave in a paraxial region thereof, both the object-side and image-side surfaces 241, 242 are aspheric, and the fourth lens element 240 is made of plastic material. The object-side surface 241 has two inflection points and two critical points in an off-axis region thereof, part of the object-side surface 241 is convex at the critical point on the radial outer side, and part of the object-side surface 241 is concave at the critical point on the radial inner side. The image-side surface 242 has an inflection point and a critical point in an off-axis region thereof, and part of the image-side surface 242 is convex at the critical point.

The IR filter 250 is a glass plate, is located between the fourth lens element 240 and the image plane 260 (at the image-side of the fourth lens element 240), and has no influence on the focal length of the optical imaging lens device.

The detailed parameters of the elements in the first embodiment are shown in Table 4, wherein a focal length of the optical imaging lens device is f, a f-number of the optical imaging lens device is Fno, half of the maximal field of view of the optical imaging lens device is HFOV, and the units of the radius of curvature, the surface spacing and the focal length in table 4 are expressed in mm.

TABLE 4 f(focal length) = 1.9 mm, Fno = 2.08, HFOV = 44 deg., the reference wavelength is 587.6 nm

| Surface | | Curvature Radius | Surface spacing | Focal length | index | Abbe # |
|---|---|---|---|---|---|---|
| 0 | Object | Plane | Infinity | — | — | — |
| 1 | Aperture stop | Plane | −0.057767448 | — | — | — |
| 2 | Lens 1 | 1.34373826578171 | 0.34359251 | 2.30757 | 1.5445 | 55.99 |
| 3 | | −18.526884087454 | 0.254816964 | | | |
| 4 | Lens 2 | −7.51814914845191 | 0.224241029 | −5.13842 | 1.6713 | 19.243 |
| 5 | | 6.56282360258329 | 0.116764115 | | | |
| 6 | Lens 3 | −1.07494190145571 | 0.457682398 | 1.399363 | 1.5445 | 55.99 |
| 7 | | −0.513939551550303 | 0.018923181 | | | |
| 8 | Lens 4 | 1.14357944077624 | 0.352527336 | −2.04476 | 1.5445 | 55.99 |
| 9 | | 0.503527692812042 | 0.638255686 | | | |
| 10 | IR filter | Plane | 0.145 | — | 1.518 | 64.2 |
| 11 | | Plane | 0.211589564 | | | |
| 12 | Image plane | Plane | — | — | — | — |

The aspheric surface data of the second embodiment is shown in Table 5, and the results of substituting the parameters of the second embodiment in the above conditions (1) to (11) are shown in Table 6. In the second embodiment, the equation of the aspheric surface profiles of the aforementioned lens elements in the second embodiment is the same as the equation of the first embodiment. Also, the definitions of these parameters shown in the following table are the same as those stated in the first embodiment with corresponding values for the second embodiment, so an explanation in this regard will not be provided again.

TABLE 5

| Aspheric Coefficients | | | | |
|---|---|---|---|---|
| Surface # | 2 | 3 | 4 | 5 |
| K= | −8.27705E+01 | 1.48740E+01 | −6.83118E+01 | 7.65203E+01 |
| A4= | 3.08728E+00 | −4.47437E−01 | −1.25761E+00 | −7.58980E−01 |

TABLE 5-continued

| Aspheric Coefficients | | | | |
|---|---|---|---|---|
| A6= | −3.78722E+01 | −4.49341E+00 | 3.50916E−01 | 2.14399E+00 |
| A8= | 3.12392E+02 | 3.88552E+01 | −2.06444E+01 | −1.41033E+01 |
| A10= | −1.63570E+03 | −2.20044E+02 | 1.17680E+02 | 4.23696E+01 |
| A12= | 4.65320E+03 | 6.18958E+02 | −1.66358E+02 | −4.35033E+01 |
| A14= | −5.54256E+03 | −6.87038E+02 | 3.19018E+01 | 8.24935E+00 |

| Surface # | 6 | 7 | 8 | 9 |
|---|---|---|---|---|
| K= | −1.89847E+01 | −8.54267E−01 | −3.17657E+00 | −4.56623E+00 |
| A4= | −1.03248E+00 | 1.04452E+00 | −7.24543E−01 | −3.67673E−01 |
| A6= | 7.42482E+00 | −3.09791E+00 | 1.07230E+00 | 4.29899E−01 |
| A8= | −3.01873E+01 | 7.76739E+00 | −1.14060E+00 | −3.90140E−01 |
| A10= | 7.03425E+01 | −7.91010E+00 | 7.44156E−01 | 2.13154E−01 |
| A12= | −7.92031E+01 | 4.51131E+00 | −2.52285E−01 | −6.43494E−02 |
| A14= | 3.22034E+01 | −1.47454E+00 | 3.42815E−02 | 8.17650E−03 |

TABLE 6

| Vd1/CT1 | 162.95466 | ($|f1|$ + $|f3|$)/($|f2|$ + $|f4|$) | 0.5160579 |
|---|---|---|---|
| Vd2/CT2 | 85.813912 | Nmax − Nmin | 0.1268 |
| Vd3/CT3 | 122.33374 | Dr4r6/TTL | 0.1234009 |
| Vd4/CT4 | 158.82456 | (R4 − R5)/R4 + R5) | 14.73945 |
| Dr7r8 × 100/TTL | 13.441828 | f3/f | 0.7365068 |
| FOV | 88 | | |

It can be appreciated from Table 6 that the optical imaging lens device of the second embodiment meets the above conditions (1) to (11).

Figure 5:
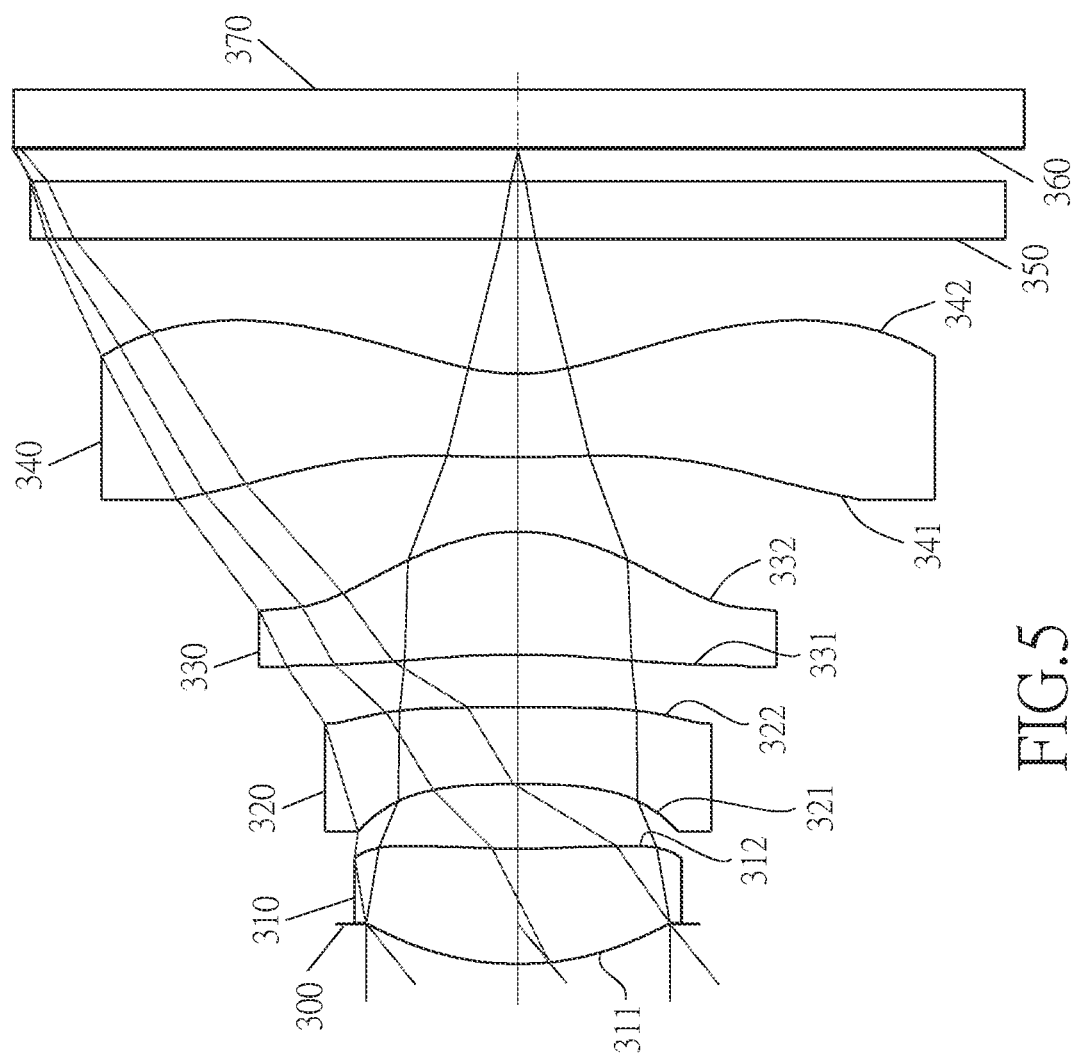
FIG. 5 is a schematic diagram showing an optical imaging lens device in accordance with a third embodiment of the present invention.
Figure 6:
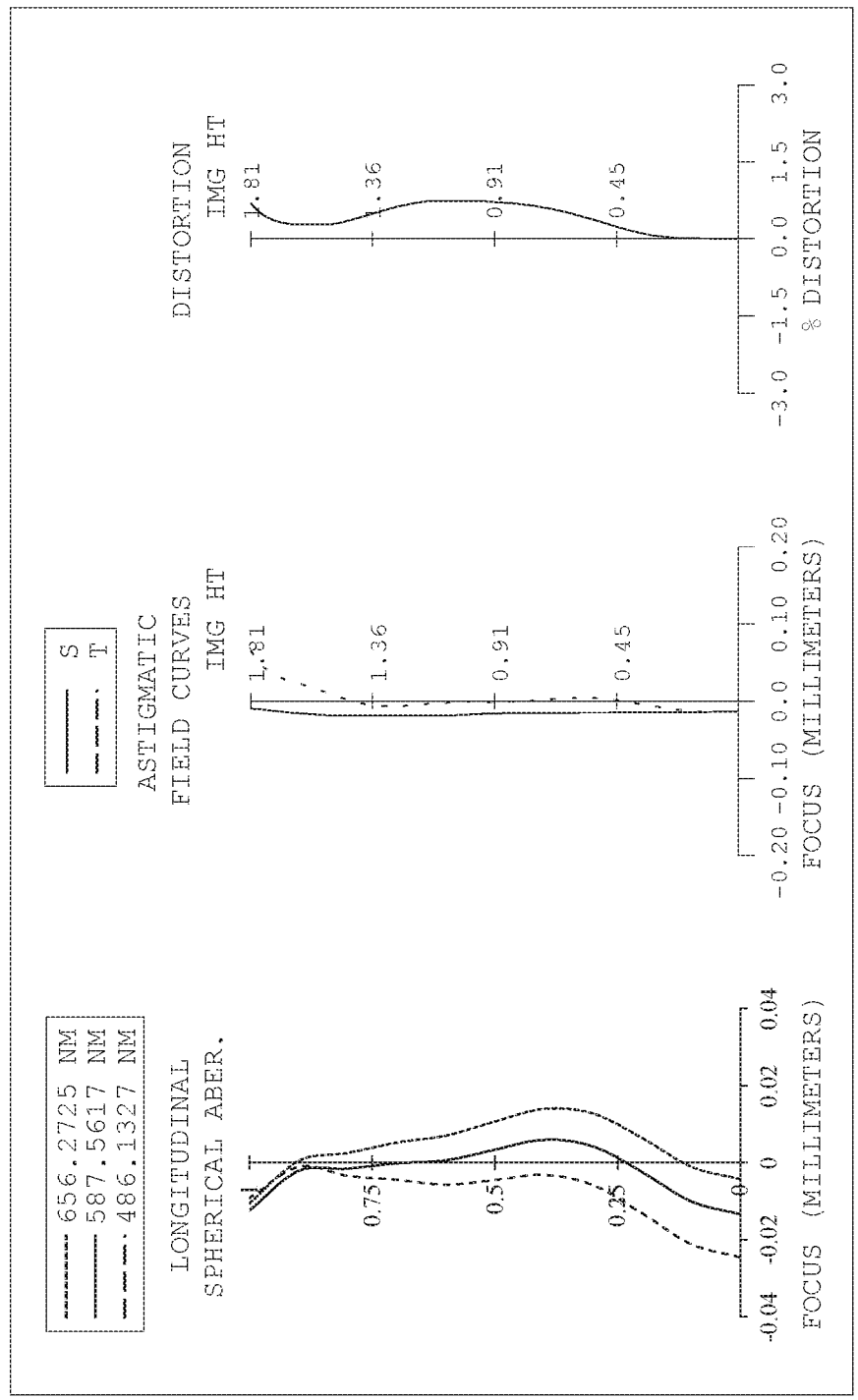
FIG. 6 is a schematic diagram showing the longitudinal spherical aberration curve, the astigmatic field curve and the distortion curve of the third embodiment of the present invention.

An optical imaging lens device in accordance with a third embodiment of the present invention shown in FIGS. 5 and 6 comprises, in order from an object side to an image side: an aperture stop 300, a first lens element 310, a second lens element 320, a third lens element 330, a fourth lens element 340, an IR filter 350, and an image plane 360, and an image sensor 370 is disposed on the image plane 360. The optical imaging lens device comprises four lens elements (310, 320, 330, 340) and there are no other interpolated lens elements between the lens elements.

The first lens element 310 with positive refractive power has an object-side surface 311 being convex in a paraxial region thereof and an image-side surface 312 being concave in a paraxial region thereof, both the object-side and image-side surfaces 311, 312 are aspheric, and the first lens element 310 is made of plastic material.

The second lens element 320 with negative refractive power has an object-side surface 321 being concave in a paraxial region thereof, and an image-side surface 322 being convex in a paraxial region thereof, both the object-side and image-side surfaces 321, 322 are aspheric, and the second lens element 320 is made of plastic material.

The third lens element 330 with positive refractive power has an object-side surface 331 being concave in a paraxial region thereof, and an image-side surface 332 being convex in a paraxial region thereof, both the object-side and image-side surfaces 331, 332 are aspheric, and the third lens element 330 is made of plastic material.

The fourth lens element 340 with negative refractive power has an object-side surface 341 being convex in a paraxial region thereof, and an image-side surface 342 being concave in a paraxial region thereof, both the object-side and image-side surfaces 341, 342 are aspheric, and the fourth lens element 340 is made of plastic material. The object-side surface 341 has two inflection points and two critical points in an off-axis region thereof, part of the object-side surface 341 is convex at the critical point on the radial outer side, and part of the object-side surface 341 is concave at the critical point on the radial inner side. The image-side surface 342 has an inflection point and a critical point in an off-axis region thereof, and part of the image-side surface 342 is convex at the critical point.

The IR filter 350 is a glass plate, is located between the fourth lens element 340 and the image plane 360 (at the image side of the fourth lens element 340), and has no influence on the focal length of the optical imaging lens device.

The detailed parameters of the components in the third embodiment is shown in Table 7, wherein a focal length of the optical imaging lens device is f, a f-number of the optical imaging lens device is Fno, half of the maximal field of view of the optical imaging lens device is HFOV, and the units of the radius of curvature, the surface spacing and the focal length in table 7 are expressed in mm.

TABLE 7 f(focal length) = 2.24 mm, Fno = 2.05, HFOV = 38.7 deg., the reference wavelength is 587.6 nm

| Surface | | Curvature Radius | Surface spacing | Focal length | index | Abbe # |
|---|---|---|---|---|---|---|
| 0 | Object | Plane | Infinity | — | — | — |
| 1 | Aperture stop | Plane | −0.146370443 | — | — | — |
| 2 | Lens 1 | 1.04389493887677 | 0.418022841 | 2.445362 | 1.5445 | 55.99 |
| 3 | | 4.10074677055852 | 0.23534438 | | | |
| 4 | Lens 2 | −2.95151209223564 | 0.277674914 | −5.01177 | 1.6613 | 20.373 |
| 5 | | −26.1365401952144 | 0.190497209 | | | |
| 6 | Lens 3 | −3.0068050316139 | 0.445410079 | 1.523661 | 1.5445 | 55.99 |
| 7 | | −0.686000561359037 | 0.270250457 | | | |
| 8 | Lens 4 | 4.81815485095052 | 0.30232429 | −1.6257 | 1.5445 | 55.99 |
| 9 | | 0.733241118106954 | 0.488520207 | | | |

TABLE 7-continued f(focal length) = 2.24 mm, Fno = 2.05, HFOV = 38.7 deg., the reference wavelength is 587.6 nm

| Surface | | Curvature Radius | Surface spacing | Focal length | index | Abbe # |
|---|---|---|---|---|---|---|
| 10 | IR filter | Plane | 0.21 | — | 1.518 | 64.2 |
| 11 | | Plane | 0.12028083 | | | |
| 12 | Image plane | Plane | — | — | — | — |

The aspheric surface data of the third embodiment is shown in Table 8, and the results of substituting the parameters of the second embodiment in the above conditions (1) to (11) are shown in Table 9. In the third embodiment, the equation of the aspheric surface profiles of the aforementioned lens elements in the third embodiment is the same as the equation of the first embodiment. Also, the definitions of these parameters shown in the following table are the same as those stated in the first embodiment with corresponding values for the third embodiment, so an explanation in this regard will not be provided again.

TABLE 8

Aspheric Coefficients

| Surface # | 2 | 3 | 4 | 5 |
|---|---|---|---|---|
| K= | −4.15861E+00 | −1.12053E+01 | 2.20287E+01 | 1.05054E+01 |
| A4= | 3.48647E−01 | −1.96300E−01 | −6.05471E−01 | −1.78057E−01 |
| A6= | 1.11979E+00 | −1.64960E−01 | −6.93379E−01 | −9.08795E−01 |
| A8= | −1.06430E+01 | −4.26903E+00 | −1.19606E+00 | 2.74587E+00 |
| A10= | 3.78249E+01 | 1.06562E+01 | −9.87553E+00 | −8.91092E+00 |
| A12= | −5.68448E+01 | −2.57960E+01 | 4.83148E+01 | 1.96838E+01 |
| A14= | 7.34951E+00 | 1.42097E+01 | −1.84982E+01 | −1.14719E+01 |

| Surface # | 6 | 7 | 8 | 9 |
|---|---|---|---|---|
| K= | −2.20688E+01 | −8.38824E−01 | 3.74912E+00 | −5.16702E+00 |
| A4= | 1.39338E−01 | 5.56899E−01 | −5.77876E−01 | −3.33222E−01 |
| A6= | −1.12771E−01 | −7.86932E−01 | 6.91069E−01 | 3.62537E−01 |
| A8= | 9.27513E−01 | 1.77561E+00 | −5.72752E−01 | −2.83508E−01 |
| A10= | −3.53807E+00 | 4.82282E−02 | 3.69613E−01 | 1.33009E−01 |
| A12= | 5.77991E+00 | −2.30401E+00 | −1.47509E−01 | −3.40362E−02 |
| A14= | −3.58607E+00 | 1.20945E+00 | 2.44073E−02 | 3.58926E−03 |

TABLE 9

| Vd1/CT1 | 133.94005 | $(|f1| + |f3|)/(|f2| + |f4|)$ | 0.5979727 |
|---|---|---|---|
| Vd2/CT2 | 73.36997 | Nmax − Nmin | 0.1168 |
| Vd3/CT3 | 125.70438 | Dr4r6/TTL | 0.1582558 |
| Vd4/CT4 | 185.19848 | (R4 − R5)/R4 + R5) | −0.797064 |
| Dr7r8 × 100/TTL | 19.354693 | f3/f | 0.6802058 |
| FOV | 77.4 | | |

It can be appreciated from Table 9 that the optical imaging lens device of the third embodiment meets the above conditions (1) to (11).

While we have shown and described various embodiments in accordance with the present invention, it should be clear to those skilled in the art that further embodiments may be made without departing from the scope of the present invention.

What is claimed is:

1. An optical imaging lens device, comprising four lens elements each having an object-side surface facing an object side and an image-side surface facing an image side, and the four lens elements in order from the object side to the image side comprising:

a first lens element with positive refractive power, having the object-side surface that is convex in a paraxial region thereof;

a second lens element with negative refractive power, having the object-side surface that is concave in a paraxial region thereof;

a third lens element with positive refractive power, having the object-side surface that is concave in a paraxial region thereof, and the image-side surface that is convex in a paraxial region thereof;

a fourth lens element with negative refractive power, having the object-side surface that is convex in a paraxial region thereof and is concave in an off-axis region thereof, and the image-side surface that is concave in a paraxial region thereof and is convex in an off-axis region thereof;

wherein an Abbe number of the first lens element is Vd1, an Abbe number of the second lens element is Vd2, an Abbe number of the third lens element is Vd3, an Abbe number of the fourth lens element is Vd4, a distance between the object-side surface and the image-side surface of the first lens element in an optical axis is CT1, a distance between the object-side surface and the image-side surface of the second lens element in the optical axis is CT2, a distance between the object-side surface and the image-side surface of the third lens element in the optical axis is CT3, a distance between the object-side surface and the image-side surface of the fourth lens element in the optical axis is CT4, a focal length of the first lens element is f1, a focal length of the second lens element is f2, a focal length of the third lens element is f3, a focal length of the fourth lens element is f4, a minimum refractive index of refractive indexes of the lens elements is Nmin, a maximum refractive index of the refractive indexes of the lens elements is Nmax, and the optical imaging lens device satisfies the follows:

$Vd2/CT2 \leq Vd3/CT3 \leq Vd1/CT1;$ $100 \leq Vd4/CT4 \leq 250;$ $0.2<(|f1|+|f3|)/(|f2|+|f4|)<1.0;$ or $0.11 \leq N\max - N\min;$ and wherein a focal length of the optical imaging lens device is f, and the optical imaging lens device further satisfies the follows: $0.65<f3/f<0.75$.

2. The optical imaging lens device as claimed in claim 1, wherein the optical imaging lens device further satisfies the follows:

$150 \leq Vd4/CT4 \leq 230;$ the Abbe number of the fourth lens element is Vd4, and the distance between the object-side surface and the image-side surface of the fourth lens element in the optical axis is CT4.

3. The optical imaging lens device as claimed in claim 1, wherein the optical imaging lens device further satisfies the follows:

$0.3<(|f1|+|f3|)/(|f2|+|f4|)<0.6;$ the focal length of the first lens element is f1, the focal length of the second lens element is f2, the focal length of the third lens element is f3, and the focal length of the fourth lens element is f4.

4. The optical imaging lens device as claimed in claim 1, wherein the optical imaging lens device further satisfies the follows:

$Dr4r6/TTL<0.16;$ a distance from the object-side surface of the second lens element to the object-side surface of the third lens element along the optical axis is Dr4r6, and a distance from the object-side surface of the first lens element to an image plane along the optical axis is TTL.

5. The optical imaging lens device as claimed in claim 1, wherein the optical imaging lens device further satisfies the follows:

$-1<(R4-R5)/(R4+R5)<15;$ a radius of curvature of the object-side surface of the second lens element is R4, and a radius of curvature of an image-side surface of the second lens element is R5.

6. An optical imaging lens device, comprising four lens elements each having an object-side surface facing an object side and an image-side surface facing an image side, and the four lens elements in order from the object side to the image side comprising: a first lens element with positive refractive power, having the object-side surface that is convex in a paraxial region thereof; a second lens element with negative refractive power, having the object-side surface that is concave in a paraxial region thereof; a third lens element with positive refractive power, having the object-side surface that is concave in a paraxial region thereof, and the image-side surface that is convex in a paraxial region thereof; a fourth lens element with negative refractive power, having the object-side surface that is convex in a paraxial region thereof and is concave in an off-axis region thereof, and the image-side surface that is concave in a paraxial region thereof and is convex in an off-axis region thereof, wherein an Abbe number of the first lens element is Vd1, an Abbe number of the second lens element is Vd2, an Abbe number of the third lens element is Vd3, an Abbe number of the fourth lens element is Vd4, a distance between the object-side surface and the image-side surface of the first lens element in an optical axis is CT1, a distance between the object-side surface and the image-side surface of the second lens element in the optical axis is CT2, a distance between the object-side surface and the image-side surface of the third lens element in the optical axis is CT3, a distance between the object-side surface and the image-side surface of the fourth lens element in the optical axis is CT4, a focal length of the first lens element is f1, a focal length of the second lens element is f2, a focal length of the third lens element is f3, a focal length of the fourth lens element is f4, a minimum refractive index of refractive indexes of the lens elements is Nmin, a maximum refractive index of the refractive indexes of the lens elements is Nmax, and the optical imaging lens device satisfies the follows: $Vd2/CT2 \leq Vd3/CT3 \leq Vd1/CT1;$ $100 \leq Vd4/CT4 \leq 250;$ $0.2<(|f1|+|f3|)/(|f2|+|f4|)<1.0;$ or $0.11 \leq N\max - N\min;$ and wherein the optical imaging lens device further satisfies the follows: $Vd4-Vd2>35$.

7. An optical imaging lens device, comprising four lens elements each having an object-side surface facing an object side and an image-side surface facing an image side, and the four lens elements in order from the object side to the image side comprising: a first lens element with positive refractive power, having the object-side surface that is convex in a paraxial region thereof; a second lens element with negative refractive power, having the object-side surface that is concave in a paraxial region thereof; a third lens element with positive refractive power, having the object-side surface that is concave in a paraxial region thereof, and the image-side surface that is convex in a paraxial region thereof; a fourth lens element with negative refractive power, having the object-side surface that is convex in a paraxial region thereof and is concave in an off-axis region thereof, and the image-side surface that is concave in a paraxial region thereof and is convex in an off-axis region thereof, wherein an Abbe number of the first lens element is Vd1, an Abbe number of the second lens element is Vd2, an Abbe number of the third lens element is Vd3, an Abbe number of the fourth lens element is Vd4, a distance between the object-side surface and the image-side surface of the first lens element in an optical axis is CT1, a distance between the object-side surface and the image-side surface of the second lens element in the optical axis is CT2, a distance between the object-side surface and the image-side surface of the third lens element in the optical axis is CT3, a distance between the object-side surface and the image-side surface of the fourth lens element in the optical axis is CT4, a focal length of the first lens element is f1, a focal length of the second lens element is f2, a focal length of the third lens element is f3, a focal length of the fourth lens element is f4, a minimum refractive index of refractive indexes of the lens elements is Nmin, a maximum refractive index of the refractive indexes of the lens elements is Nmax, and the optical imaging lens device satisfies the follows: $Vd2/CT2 \leq Vd3/CT3 \leq Vd1/CT1;$ $100 \leq Vd4/CT4 \leq 250;$ $0.2<(|f1|+|f3|)/(|f2|+|f4|)<1.0;$ or $0.11 \leq N\max - N\min;$ and wherein a distance from the image-side surface of the third lens element to the object-side surface of the fourth lens element along the optical axis is Dr7r8, and a distance from the object-side surface of the first lens element to an image plane along the optical axis is TTL, and the optical imaging lens device further satisfies the follows: $10<Dr7r8 \times 100/TTL<20$.

8. The optical imaging lens device as claimed in claim 1, wherein the optical imaging lens device further satisfies the follows:

$$Dr4r7/f<0.6;$$

a distance from the object-side surface of the second lens element to the image-side surface of the third lens element along the optical axis is $Dr4r7$, and the focal length of the optical imaging lens device is f.

9. The optical imaging lens device as claimed in claim 1, wherein the optical imaging lens device further satisfies the follows:

$$FOV>77 \text{ degrees};$$

a maximal field of view of the optical imaging lens device is FOV.

10. The optical imaging lens device as claimed in claim 1, wherein the image-side surface of the first lens element is concave in a paraxial region thereof, and the image-side surface of the second lens element is convex in a paraxial region thereof.

11. The optical imaging lens device as claimed in claim 1, wherein the image-side surface of the first lens element is convex in a paraxial region thereof, and the image-side surface of the second lens element is concave in a paraxial region thereof.

12. The optical imaging lens device as claimed in claim 6, wherein the focal length of the first lens element is f1, the focal length of the second lens element is f2, the focal length of the third lens element is f3, and the focal length of the fourth lens element is f4, and the optical imaging lens device further satisfies the follows: $0.3<(|f1|+|f3|)/(|f2|+|f4|)<0.6$.

13. The optical imaging lens device as claimed in claim 6, wherein a maximal field of view of the optical imaging lens device is FOV, and the optical imaging lens device further satisfies the follows: FOV>77 degrees.

14. The optical imaging lens device as claimed in claim 6, wherein the image-side surface of the first lens element is concave in a paraxial region thereof, and the image-side surface of the second lens element is convex in a paraxial region thereof.

15. The optical imaging lens device as claimed in claim 7, wherein the focal length of the first lens element is f1, the focal length of the second lens element is f2, the focal length of the third lens element is f3, and the focal length of the fourth lens element is f4, and the optical imaging lens device further satisfies the follows: $0.3<(|f1|+|f3|)/(|f2|+|f4|)<0.6$.

16. The optical imaging lens device as claimed in claim 7, wherein a maximal field of view of the optical imaging lens device is FOV, and the optical imaging lens device further satisfies the follows: FOV>77 degrees.

17. The optical imaging lens device as claimed in claim 7, wherein the image-side surface of the first lens element is concave in a paraxial region thereof, and the image-side surface of the second lens element is convex in a paraxial region thereof.

* * * * *